United States Patent [19]

Martin

[11] 4,148,838

[45] Apr. 10, 1979

[54] SILYLATED BLOCK COPOLYMERS

[75] Inventor: Eugene R. Martin, Onsted, Mich.

[73] Assignee: SWS Silicones Corporation, Adrian, Mich.

[21] Appl. No.: 813,157

[22] Filed: Jul. 5, 1977

Related U.S. Application Data

[62] Division of Ser. No. 645,733, Dec. 31, 1975, Pat. No. 4,080,400, which is a division of Ser. No. 533,051, Dec. 16, 1974, abandoned.

[51] Int. Cl.$^2$ .................... C08F 293/00; C08F 297/02
[52] U.S. Cl. ..................................... 260/825; 260/827
[58] Field of Search ............................... 260/825, 827

[56] References Cited

U.S. PATENT DOCUMENTS

| | | | |
|---|---|---|---|
| 3,051,684 | 8/1962 | Morton et al. | 260/827 |
| 3,483,270 | 12/1969 | Bostick | 260/827 |
| 3,637,899 | 1/1972 | Nametkin et al. | 260/827 |
| 3,870,766 | 3/1975 | Chadha | 260/825 |

FOREIGN PATENT DOCUMENTS 957097  10/1974  Canada ..................................... 260/827

*Primary Examiner*—Allan Lieberman

[57] ABSTRACT

Alkali metal terminated organic polymers are reacted with silicon containing compounds having aliphatic unsaturation to produce a new class of reactive silylated organic polymers. These silylated organic polymers can in turn be reacted with cyclic siloxanes to produce silylated organic-organopolysiloxane block copolymers which are useful as protective coatings, surfactants and as elastomers.

5 Claims, No Drawings

SILYLATED BLOCK COPOLYMERS

This application is a division of application Ser. No. 645,733, filed Dec. 31, 1975 and now U.S Pat. No. 4,080,400 which was a division of application Ser. No. 533,051, filed Dec. 16, 1974, and now abandoned.

The present invention relates to organic polymers containing silicon atoms, particularly to silylated organic polymers and more particularly to silylated organic-organopolysiloxane block copolymers.

Heretofore, copolymers have been prepared by reacting alkali metal terminated organic polymers free of silicon atoms with cyclic siloxanes. (See U.s. Pat. Nos. 3,483,270 and 3,051,684 to Bostick and Morton et al, respectively.) However, neither of these references disclose the formation of silylated polymers by reacting alkali metal terminated organic polymers with silicon compounds having aliphatic unsaturation of form organic polymers containing silicon atoms. Moreover, these references do not disclose silylated organic-organopolysiloxane block copolymers or a method for preparing the same.

Therefore, it is an object of this invention to prepare silylated organic polymers. Another object of this invention is to provide silylated organic-organopolysiloxane block copolymers. Still another object of this invention is to provide a method for preparing silylated organic polymers. A further object of this invention is to provide a method for preparing silylated organic-organopolysiloxane block copolymers.

These and other objects which will become apparent from the following description are accomplished in accordance with this invention, generally speaking, by reacting (A) alkali metal terminated organic polymers with (B) silanes containing aliphatic unsaturation in the presence of an aprotic solvent to produce silylated organic polymers of the formula

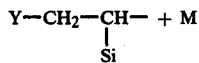

where M is an alkali metal, Y is the organic polymer and the unsatisfied valences of the silicon atom are satisfied by a hydrocarbon radical or Y. These silylated organic polymers described above may be further reacted with other silanes containing aliphatic unsaturation or with unsaturated monomers capable of anionic polymerization to form block copolymers of silylated organic polymers. These silylated organic polymers or block copolymers are reacted with cyclic siloxanes to form silylated organic-organopolysiloxane block copolymers.

More specifically, these polymers may be prepared by reacting a carbanion producing catalyst with unsaturated monomers in the presence of an aprotic solvent. Examples of suitable carbanion producing catalysts are alkali metals such as lithium, sodium, potassium, rubidium, cesium and organoalkali metal compounds such as lithium naphthalene, lithium anthracene, butyl lithium, vinyl lithium, lithium stilbene, biphenyl lithium, 1,4-dilithiothiobenzene, 1,5-dilithiopentane, 1,5-dilithionaphthalene, 1,2-dilithio-1,3,3-triphenylpropane, 1,3,5-trilithiopentane, sodium naphthalene, notassium naphthalene, rubidium naphthalene, cesium naphthalene, sodium anthracene, potassium anthracene, rubidium anthracene, cesium anthracene, sodium stilbene, potassium stilbene, rubidium stilbene, cesium stilbene, 9-fluorenyl sodium, 9-fluorenyl potassium, 9-fluorenyl cesium, diphenyl sodium, diphenyl potassium, diphenyl rubidium, diphenyl cesium and the like. monalkylene The term "aprotic solvent" refers to any organic solvent which is free of active protons. These may include hydrocarbon solvents such as heptane, benzene, toluene and xylene and the like. It is preferred but not necessary that an aprotic solvent capable of coordinating with the alkali metal be employed. These include nonacid oxygen containing and nitrogen containing organic solvents such as tetrahydrofuran, tetrahydropyrane, diethoxyethane; alkyl ethers such as diethyl ether, dibutyl ether, methyl ethyl ether; higher boiling ethers such as monoalkylene glycol dialkyl ethers, dialkylene glycol monoalkyl ethers, dialkylene glycol dialkyl ethers and monoal kylene glycol monoalkyl ethers, dimethyl acetamide, N-methylpyrrolidine, isobutylene oxide, dimethyl sulfoxide, dioxane, diethyl ether of diethylene glycol, and various tertiary amines such as dimethyl aniline, tributylamine, pyridine and the like. For obvious reasons, solvents which contain an acid hydrogen should be avoided.

Any unsaturated monomer that may be polymerized by anionic polymerization techniques may be employed in this invention. Also, any polymerized substituted olefin having C. unsaturation is operative in this invention. Specific examples of suitable monomers are hydrocarbon olefins such as ethylene, butadiene, styrene, vinyltoluene, divinylbenzene, isoprene, unsaturated esters such as the acrylates and alkyl substituted acrylates, e.g., methylacrylate, methylmethacrylate, ethylacrylate, butylacrylate and unsaturated nitriles such as acrylonitrile, methacrylonitrile and the like.

The reaction between the carbanion forming catalyst and the unsaturated organic polymers may be conducted at any temperature below 150° C. preferably below about 100° C. and more preferably between about 0° C. and 50° C.

The alkali metal terminated organic polymers thus formed may be reacted with silicon compounds containing aliphatic unsaturation. These silicon compounds may be represented by the general formula

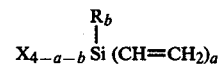

where R is a monovalent hydrocarbon radical, X is a member selected from the class consisting of halogen, hydrocarbonoxy radicals, acyloxy radicals, phosphato radicals, sulfato radicals, perchlorate radicals, or any other groups which are reactive with the alkalimetal carbanion, a is a number of from 1 to 4 and b is a number of from 1 to 3.

Suitable examples of radicals represented by X are halogens such as chlorine, fluorine, bromine and iodine; acyloxy radicals of the formula

in which R' is hydrogen or an organic radical such as an alkyl or aryl radical having from 1 to 18 carbon atoms; hydrocarbonoxy radicals of the formula -OR" in which R" is an organic radical such as alkyl or aryl radicals of from 1 to 10 carbon atoms; phosphato radicals of the formula

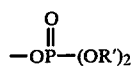

in which R' is the same as above; sulfur containing radicals of the formula SO$_y$ where y is an integer of from 2 to 4 and chlorates of the formula —ClO$_4$.

Suitable examples of alkyl radicals represented by R are methyl, ethyl, propyl, butyl, pentyl, hexyl, octyl, decyl, octadecyl and the like; aryl radicals such as phenyl, naphthyl, biphenyl and the like; alkaryl radicals such as tolyl, xylyl, ethylphenyl and the like; aralkyl radicals such as benzyl, phenylethyl and the like. The organic radicals represented by R' and R" may be the same as the alkyl and aryl radicals represented by R.

Examples of suitable silanes having aliphatic unsaturation which may be employed in the preparation of the silylated organic polymers are vinyltrichlorosilane, divinyldichlorosilane, divinyldiacetoxysilane, dimethoxymethylvinylsilane, methylvinyldiacetoxysilane, dimethylvinylbromosilane, trimethylvinylsilane, tributylvinylsilane, phenylmethylvinylchlorosilane, dibutylvinylacetoxysilane and the like.

The reaction between the alkali metal terminated organic polymers and the silanes containing aliphatic unsaturation may be carried out in the presence or absence of a solvent. It is oreferred that the reaction be conducted in the presence of aprotic solvents which are capable of coordinating with the alkali-metal cation. Surprisingly, it has been found that when such solvents are employed, the alkali-metal carbanion preferably reacts with the halogen or other reactive groups before it reacts with the C=C unsaturated group, thus permitting a greater degree of control of molecular weight and chain branching. The aprotic solvents employed may be the same as those described heretofore. Although the amount of solvent is not critical, it is preferred that from 1 to 95 percent by weight of solvent be presented based on the weight of the alkali metal organic polymers and unsaturated silanes.

Generally, the reaction is carried out at a temperature of from about 0° to 150° C. And more preferably from about 10 to 50° C. Higher or lower temperatures may however be employed, if desired.

The preparation of the alkali metal terminated organic polymers may be illustrated by the following equations, although these are not intended to limit the scope of the invention.

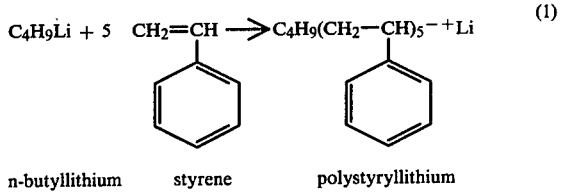

n-butyllithium    styrene    polystyryllithium

The reaction between the resulting organometallic hydrocarbon compound of equation (1) and the silane containing an unsaturation aliphatic group may be illustrated in the following manner.

When the polystyryllithium compound is reacted with, for example, vinyltrichlorosilane, a branched silicon-hydrocarbon polymer is formed.

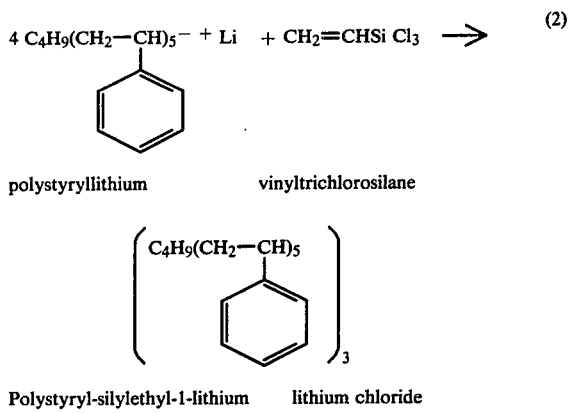

polystyryllithium    vinyltrichlorosilane

Polystyryl-silylethyl-1-lithium    lithium chloride

When the polystyryllithium compound is reacted with for example, a trimethylvinylsilane, as illustrated below a linear silicon hydrocarbon polymer is formed.

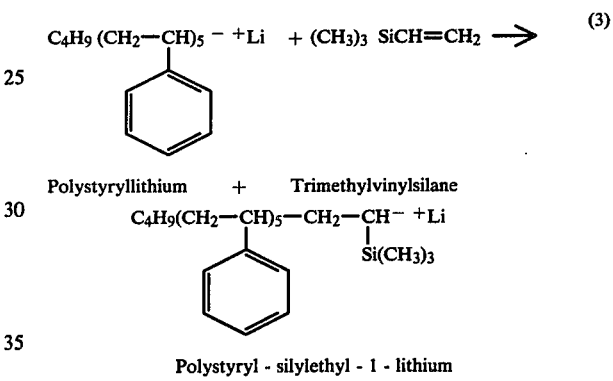

Polystyryllithium  +  Trimethylvinylsilane

Polystyryl - silylethyl - 1 - lithium

In accordance with the invention the hydrocarbon-silylethyl-1-alkali-metal can be reacted with a cycli organopolysiloxane to form block copolymers containing silicon-hydrocarbon segments and organopolysiloxane segments. Cyclic organopolysiloxanes which can be used in the method of this invention include those of the formula (R$_2$SiO)$_n$ in which n is at least 3 and may be up to 10 in which R is the same as above. the reaction is preferably carried out in the presence of an aprotic solvent and more preferably in the presence of an aprotic solvent which is capable of coordinating with the catalyst. The same aprotic solvents as described above may be employed in this reaction. In carrying out the reaction, the reaction temperature is not critical and may range from 25° C. to about 200° C. and more preferably from about 25° C. to 150° C. However, higher or lower temperatures may be employed, if desired.

Suitable examples of cyclic organopolysiloxanes which may be employed in the reaction are hexamethylcylotrisiloxane, 1,3,5,-trimethyl -1,3,5-triphenylcyclotrisiloxane, octamethylcyclotetrasiloxane, octaphenylcyclotetrasiloxane, decamethylcyclopentasiloxane, pentamethylpentaphenylcyclopentasiloxane, hexadecamethycycloctasiloxane and the like.

The reaction between the alkali metal silylated hydrocarbon polymers and hexamethylcyclotrisiloxane (D$_3$) may be illustrated by the following equations.

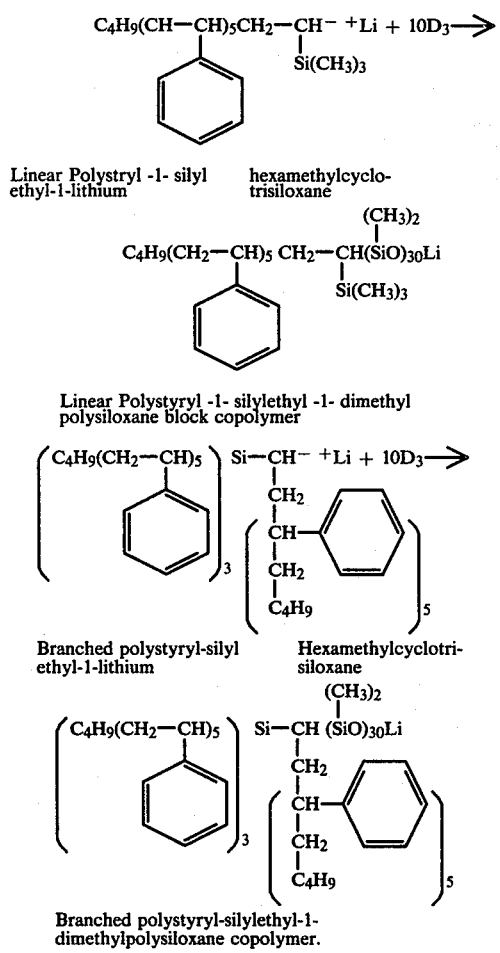

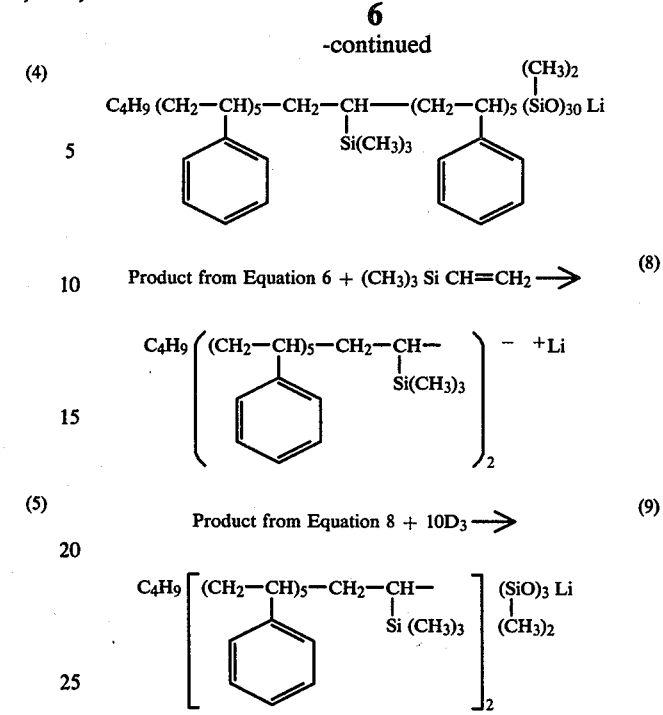

The hydrocarbon-silylethyl -1-alkali metal can be further reacted with other monomers containing other olefinic unsaturation and/or other vinyl containing silanes to form silylated hydrocarbon polymers having multiple branched or linear chains of repeating units. The resulting silylated hydrocarbon polymers described above can then be reacted with cyclic organopolysiloxanes such as described above to form silylated hydrocarbon organopolysiloxane block copolymers in which the silylated hydrocarbon polymers contain multiple branched or linear chains. The following equations illustrate the general reactions, but are not intended to limit the scope of this invention.

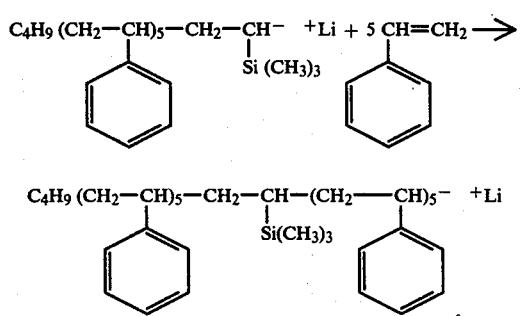

The silylated organic polymers and the copolymers consisting of silylated organic polymers and organopolysiloxanes which contain the metal carbanion or metal silanolate, respectively, may be reacted with various compounds to remove the reactive sites in the polymer. Examples of suitable compounds are water; carboxylic acids such as acetic acid, oxalic acid, formic acid, maleic acid and the like; carboxylic acid anhydrides such as acetic anhydride, phthalic anhydride, maleic anhydride and the like; inorganic acids such as hydrochloric, hydroiodic, hydrofluoric, hydrobromic, sulfuric, nitric, perchloric and the like; alcohols such as methanol, ethanol, isopropanol, 1-butanol and the like; silanes which have at least one functional group selected from the class consisting of halogen, acyloxy, phosphato, sulfato, hydrocarbonoxy and perchlorato radicals such as trimethylchlorosilane, dimethyldichlorosilane, methyltrichlorosilane, silicon tetrachloride, trimethylacetoxysilane, dimethyl disulfato silane, methyltrimethoxysilane, methyltris (diethylphosphato) silane and the like.

The silylated organic polymers and silylated organic-organopolysiloxane copolymers may be vulcanized by the conventional techniques known in the art. For example, when polydiene units are present, vulcanization is possible with sulfur as well as with other chemicals which have been used for curing natural rubber. Other vulcanization agents which may be used in place of sulfur are disulfides, alkyl phenol sulfides, p-dinitrosobenzene, sulfur dichloride, tetramethyl thiuram disulfide, tetraethyl thuran disulfide, etc. Any conventional process known to the art may be employed in the vulcanization of the above polymers such as by milling and heating in the presence of vulcanizing agents.

The silylated organic polymers and silylated organic-organopolysiloxane block copolymers obtained from vinyl monomers can be cured using the conventional curing agents employed in heat curable organopolysiloxane compositions. Examples of suitable curing agents are organic peroxides such as dicumyl peroxide, benzoyl peroxide, bis(2,4-dichlorobenzoyl) peroxide, tertiary butyl perbenzoate, high energy radiation and the like.

Moreover, these polymers may be combined with various silane or siloxane cross-linking agents known in the art to form room temperature or heat vulcanizable compositions. Examples of suitable cross-linking agents are silanes and siloxanes containing acyloxy groups having up to 10 carbon atoms such as methyltriacetoxysilane, tetraacetoxysilane and the like; silanes and siloxanes containing aryloxy or alkoxy groups such as tetraethylorthosilicate, ethyl silicate "40"; silanes containing amino groups such as methyltricyclohexyl aminosilane, hydrogen containing silanes such as methylhydrogenpolysiloxanes and the like. Other cross-linking agents which may be employed are silanes or siloxanes containing other groups which are hydrolyzable at room temperature such as oximo groups, aminooxy groups, amides and phosphato groups. Compounds such as titanates, tin salts of carboxylic acids and platinum compounds may be employed as catalysts to accelerate the curing of these compositions. Also, temperatures of from 25° C. may be used to accelerate curing.

These polymers and copolymers may be compounded with various additives, depending on the particular properties desired, before they are cured. Suitable examples of these additives are stabilizers, plasticizers, fillers preferred the like.

The block copolymers obtained herein, especially in the cured state can be employed in the manufacture of high temperature sealants, e.g., as gaskets, rings, tubing, fuel lines, insulation, motor mountings and the like.

The embodiments of this invention are further illustrated by the following examples in which all parts are by weight unless otherwise specified.

EXAMPLE I

Approximately 6 parts of a 1.5 molar solution of n-butyl lithium (0.01 mole) in heptane and 15 parts of tetrahydrofuran are added to a round bottom flask equipped with a stirrer. A nitrogen atmosphere is maintained in the flask. The mixture is cooled to 0° C. and 9.6 parts of tertiary-butyl styrene are added dropwise. The reaction mixture is stirred 0.5 hour at room temperature and then the reaction mixture is cooled to 0° C. About 0.46 part of methylvinyldichlorosilane is added dropwise to the reaction mixture. The temperature is maintained at 0° to 10° C. throughout the addition. The reaction mixture is stirred 1 hour at room temperature, then 0.06 part of acetic acid is added and the lithium acetate precipitate thus formed is removed by filtration. The silylated hydrocarbon polymer is isolated from the solvent by vacuum stripping. Analysis of the product indicates that it has the following structure.

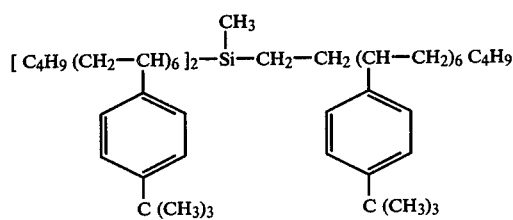

The molecular weight of the product is about 2900. The theoretical value calculated is about 3148. This illustrates that silylated hydrocarbon polymers may be prepared having a predetermined amount of branching and a predetermined molecular weight.

EXAMPLE II

The procedure of Example I is repeated except that 9-fluorenyl sodium is substituted in the same mole ratio for the n-butyl lithium. Essentially the same results are obtained.

EXAMPLE III

About 109.8 parts of a 1.5 molar solution of n-butyl lithium (1.18 moles) in heptane and 75 parts of tetrahydrofuran are added to a round bottom flask equipped with a stirrer. A nitrogen atmosphere is maintained in the flask. The mixture is cooled to 0° C. and 76.2 parts of styrene are added over a twenty minute period. The temperature throughout the addition is maintained at 0° to 10° C. The reaction mixture is stirred one hour at room temperature, then 8.6 parts of methylvinyldichlorosilane is added over a one minute period and the resulting reaction mixture is stirred for an additional hour at room temperature. The resulting silylated hydrocarbon polymer may be represented by the general formula

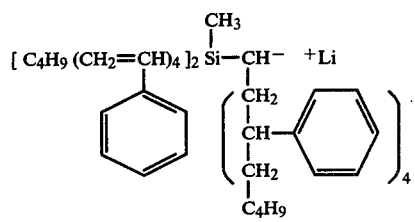

About 108.3 parts of hexamethylcyclotrisiloxane and 110 parts of benzene are added to the reaction mixture. The mixutre is refluxed for about 4.5 hours, then about 5 parts of acetic acid are added and the lithium acetate precipitate thus formed is removed by filtration. The silylated polystyryl-dimethylpolysiloxane copolymer is isolated by vacuum stripping. A grease-like composition is obtained which may be represented by the general formula

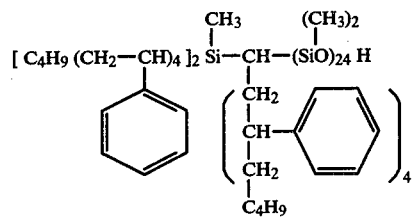

Nuclear Magnetic Resonance analysis confirms the ratio of siloxane to polystyrene of 1:0.48. Molecular weight analysis indicates a molecular weight of about 3390. The theoretical value calculated for this product is approximately 3262. This example demonstrates that silylated hydrocarbon-organopolysiloxane copolymers may be prepared having a predetermined number of silylated hydrocarbon units and organopolysiloxane units.

EXAMPLE IV

The procedure of Example III is repeated except that an equal molar amount of 9-fluorenyl potassium is substituted for the n-butyl lithium. A silylated polystyrene-dimethylpolysiloxane copolymer having a lower molecular weight than the copolymer prepared in Example III is obtained.

EXAMPLE V

The procedure of Example III is repeated except that 7.8 parts of dimethyldichlorosilane are substituted for the methylvinyldichlorosilane. The resulting product is a heterogeneous material containing a solid and liquid phase. Analysis of the solid phase indicates a composition of the general formula

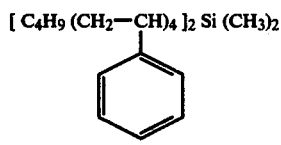

The liquid phase appears to be a product of the general formula

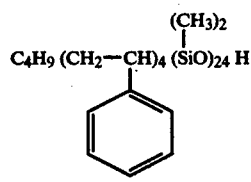

This example further illustrates that copolymers are formed when vinylfunctional silanes are employed.

EXAMPLE VI

The procedure of Example III is repeated except that 5.86 parts of methyltrivinylsilane are substituted for methylvinyldichlorosilane. The resulting product is represented by the general formula

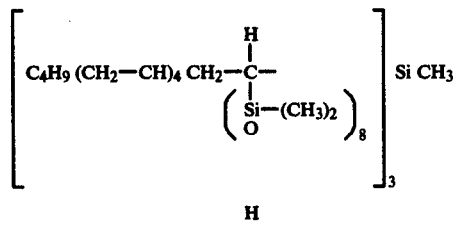

EXAMPLE VII

The procedure of Example III is repeated except that 49.6 parts of isoprene are substituted for the styrene. A silylated polyisoprene-organopolysiloxane copolymer is identified.

EXAMPLE VIII

The procedure of Example IV is repeated except that 108.3 parts of octamethylcyclotetrasiloxane are substituted for the hexamethylcyclotrisiloxane. Substantially the same results are obtained as in Example IV. This example shows that any cyclic organopolysiloxane may be used in the preparation of copolymers of this invention.

EXAMPLE IX

The product obtained from Example VI (100 parts) is mixed with 5 parts of methyltriacetoxysilane in a nitrogen atmosphere and then exposed to atmospheric moisture. After about 20 hours, an insoluble rubber-like material is obtained.

Although specific examples of the invention have been described herein, it is not intended to limit the invention solely thereto, but to include all the variations and modifications falling within the spirit and scope of the appended claims.

What is claimed is:

1. A composition obtained from the reaction of a silylated organic polymer and an unsaturated monomer capable of being polymerized by anionic polymerization and having carbon-to-carbon unsaturation, said silylated organic polymer is obtained from the reaction of a silane of the formula

where R is a monovalent hydrocarbon radical, X is selected from the class consisting of halogen, acyloxy radicals, hydrocarbonoxy radicals, sulfato radicals, phosphato radicals and perchlorato radicals, a is a number of from 1 to 4 and b is a number of from 1 to 3, with a carbanion containing organic polymer, said carbanion containing polymer is obtained from the polymerization of an unsaturated organic monomer having a carbn-to-carbon double bond in the presence of a carbanion forming catalyst.

2. The composition

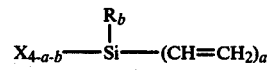

of claim 1, wherein the unsaturated monomer is a vinyl containing silane.

3. A method for preparing the composition of claim 1 which comprises reacting a silylated organic polymer with an unsaturated monomer capable of being polymerized by anionic polymerization and having carbon-to-carbon unsaturation, said silylated organic polymer is obtained by reacting a silane of the formula

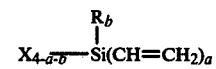

where R is a monovalent hydrocarbon radical, X is selected from the class consisting of halogen, acyloxy radicals, hydrocarbonoxy radicals, sulfato radicals, phosphato radicals and perchlorato radicals, a is a number of from 1 to 4 and b is a number of from 1 to 3, with a carbanion containing organic polymer, in the presence of an aprotic solvent said carbanion containing polymer is obtained by polymerizing an unsaturated organic monomer having a carbon-to-carbon double bond in the presence of a carbanion forming catalyst.

4. The method of claim 3, wherein the unsaturated monomer is a vinyl containing silane.

5. The method of claim 3, wherein the silylated organic polymer is obtained by reacting vinyltrichlorosilane with a carbanion containing organic polymer.

* * * * *

UNITED STATES PATENT AND TRADEMARK OFFICE
CERTIFICATE OF CORRECTION

PATENT NO. : 4,148,838
DATED : April 10, 1979
INVENTOR(S) : Eugene Ray Martin

It is certified that error appears in the above-identified patent and that said Letters Patent are hereby corrected as shown below:

Column 4, lines 10 to 15, change the formula

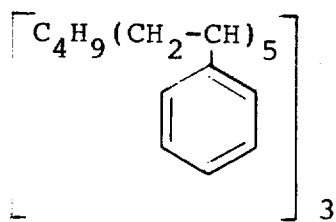

to read

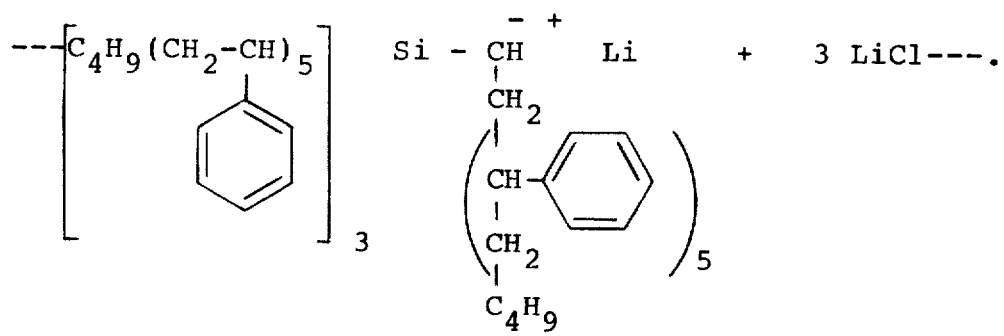

Signed and Sealed this

Seventeenth Day of November 1981

[SEAL]

Attest:

GERALD J. MOSSINGHOFF

Attesting Officer   Commissioner of Patents and Trademarks